United States Patent
Lin et al.

(10) Patent No.: US 8,046,575 B2
(45) Date of Patent: Oct. 25, 2011

(54) METHOD FOR AUTOMATICALLY RESTORING SYSTEM CONFIGURATION WITH A SINGLE KEY

(75) Inventors: Hou-Yuan Lin, Taipei (TW); Chen-Shun Chen, Taipei (TW)

(73) Assignee: Giga-Byte Technology Co., Ltd., Taipei (TW)

(*) Notice: Subject to any disclaimer, the term of this patent is extended or adjusted under 35 U.S.C. 154(b) by 658 days.

(21) Appl. No.: 12/155,296

(22) Filed: Jun. 2, 2008

(65) Prior Publication Data

US 2009/0144535 A1    Jun. 4, 2009

(30) Foreign Application Priority Data

Nov. 30, 2007 (TW) .............................. 96145803 A

(51) Int. Cl.
  *G06F 9/00*  (2006.01)
  *G06F 3/00*  (2006.01)
  *G06F 13/00* (2006.01)
  *G06F 11/00* (2006.01)

(52) U.S. Cl. .................. 713/2; 713/1; 713/100; 710/10; 710/104; 714/36

(58) Field of Classification Search .................. 713/1, 2, 713/100; 710/10, 104; 714/36
See application file for complete search history.

(56) References Cited

U.S. PATENT DOCUMENTS

| 5,845,136 | A  | * | 12/1998 | Babcock ........................ 713/300 |
| 6,253,319 | B1 | * | 6/2001  | Tran et al. .......................... 713/1 |
| 6,477,482 | B1 | * | 11/2002 | Maupin et al. ................. 702/183 |
| 6,647,512 | B1 | * | 11/2003 | James et al. ..................... 714/36 |
| 7,506,208 | B2 | * | 3/2009  | Bang ............................... 714/36 |
| 2009/0013164 | A1 | * | 1/2009 | Huang et al. ...................... 713/2 |

* cited by examiner

*Primary Examiner* — Stefan Stoynov
(74) *Attorney, Agent, or Firm* — Birch, Stewart, Kolasch & Birch, LLP

(57) ABSTRACT

A method for automatically restoring a system configuration with a single key in a computer having a power button is provided. The method includes detecting a press mode of the power button; determining a relevant restoring item according to the press mode; performing a process for restoring the system configuration corresponding to the restoring item, which aims at updating/recovering the system configuration, or clearing the system configuration setting stored in a CMOS memory; and performing a normal boot process.

7 Claims, 3 Drawing Sheets

METHOD FOR AUTOMATICALLY RESTORING SYSTEM CONFIGURATION WITH A SINGLE KEY

CROSS-REFERENCE TO RELATED APPLICATIONS

This nonprovisional application claims priority under 35 U.S.C. §119(a) on Patent Application No. 096145803, filed in Taiwan on Nov. 30, 2007, the entirety of which is incorporated herein by reference.

BACKGROUND OF THE INVENTION

1. Field of the Invention

The present invention relates to a method for restoring a system configuration, more particularly to a method for restoring a system configuration by a single key.

2. Background of the Invention

BIOS (basic input and output system) is a set of instructions stored in the chipsets to be loaded/executed when the computer is powered on. The BIOS provides a POST (Power On Self Test) procedure for booting up the computer to check whether the CPU together with the controllers or registers are functioning properly. In addition, the POST initializes memories, a main board, a graphic card and peripheral devices. The initialization process comprises creating interrupt vector(s), setting register(s), initializing and checking the hardware device(s), and providing a plurality of permanent programs which are called up by the operation system (OS) or application program. Due to the development of new technology and the demands from the consumers, the hardware devices such as CPU, memory, graphic card and other peripheral devices are frequently replaced by the hardware devices with higher performance to enhance operation efficiency of the computer. Moreover, updating the BIOS and modifying the parameters stored in the BIOS to control operation frequencies of the hardware devices can enhance the computer's operation efficiency.

Conventional method for updating the BIOS is to remove the BIOS chipset from the main board, and then to update (write) a fresh BIOS procedure or to set operational parameters by a specific device. The method for updating the BIOS is fairly time-consuming and energy-consuming, because the user has to open the computer case before removing the BIOS chipset from the main board, and reinstall the BIOS chipset after updating the BIOS. This procedure may increase the risk of damaging the pin of the BIOS chipset while the user is in the process of removing and reinstalling the BIOS chipset. With the emergence of the EEPROM (Electrically Erasable Programmable Read-Only Memory), it is not necessary to remove the BIOS chipset from the main board to update BIOS. However, in case that the operation frequency or voltage is set improperly, if the computer cannot be booted correctly or the computer is precarious after being booted, the user still has to open the computer case to adjust the clearing jumper such that the incorrect contents in the CMOS memory can be cleared and relevant parameters can be set. Therefore, a more convenient way to restore the system configuration is desired for computer users.

SUMMARY OF THE INVENTION

An object of the present invention is to provide a method for automatically restoring a system configuration with a single key. Based on the different items of restoring the BIOS, the method provides different "press" operation mode, of the power button. Therefore, it can overcome the foregoing complication for updating/recovering the BIOS, making it more convenient to maintenance the computer system.

To achieve the object, the method for automatically restoring a system configuration with a single key comprises: detecting a press mode of a power button; determining a relevant restoring item according to the press mode; performing a process for restoring the system configuration corresponding to the restoring item; performing a normal boot process.

The press mode is preferably based on the times of pressing the power button; the duration of every press on the power button; and/or the combinations of times, durations, and intervals between two immediately adjacent presses. According to the press mode of the power button, the relevant program for restoring the BIOS system configuration is determined.

In a preferred embodiment according to the present invention, the relevant program for restoring the BIOS system configuration comprises: a process for clearing the information stored in the CMOS memory, a process for restoring the original system configuration setting, a process for rewriting the BIOS program. If the press mode detected is not one of the predetermined modes, i.e., if the computer system cannot distinguish the restoring item represented by the press mode, the normal boot sequence is performed.

As described above, the method according to the present invention predefines the relation between the press modes (the ways which the user presses the power button) and the restoring items. When the power button is pressed, the restoring item represented by the press mode is determined and then the relevant program is performed. Therefore, the BIOS system can be updated/recovered or the parameters of BIOS system can be set/maintained without opening the computer case to remove the BIOS chipset, which simplifies the maintenance process of the computer.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
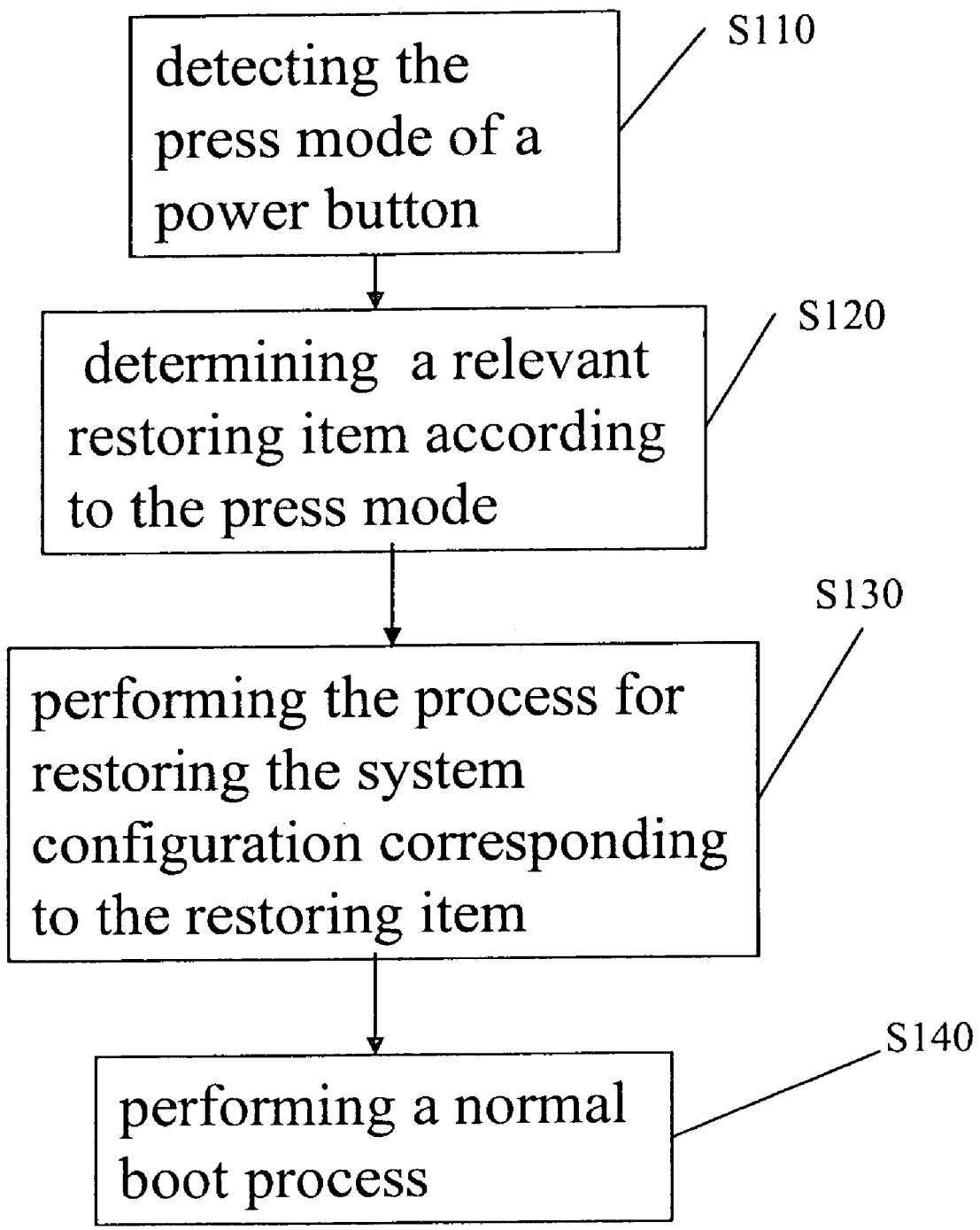
FIG. 1 is a flow chart for automatically restoring a system configuration with a single button in accordance with an embodiment of the present invention.

The present invention will now be described in detail with reference to the accompanying drawings, wherein the same reference numerals will be used to identify the same or similar elements throughout the several views. It should be noted that the drawings should be viewed in the direction of orientation of the reference numerals.

A method for automatically restoring a system configuration with a single key is performed by the control chipsets, which is embedded in the main board. Referring to the preferred embodiments described below, the method may be used to set/recover the BIOS procedure, to set/recover the system configuration, and to clear the setting information of the relevant system configuration stored in a CMOS memory. When the user updates the BIOS, or modifies the operation frequency in the case of over-frequency or over-voltage, the user maybe fail to update the BIOS or modify the motherboard setting, which leads to instability or fails to boot up the system. In this circumstance, with this method the user needs not open the computer case to unplug the BIOS chipset with effort. In addition, the user also can restore the computer system without performing complex updating steps. FIG. 1 shows a flowchart for automatically restoring the system configuration with a single key. Referring now to FIG. 1, the method comprises: (S110) firstly, detecting the "press" mode of the power button; (S120) determining the restoring item according to the "press" mode; (S130) then, performing the process for restoring the system configuration corresponding to the restoring item; and (S140) performing the boot process.

Figure 2:
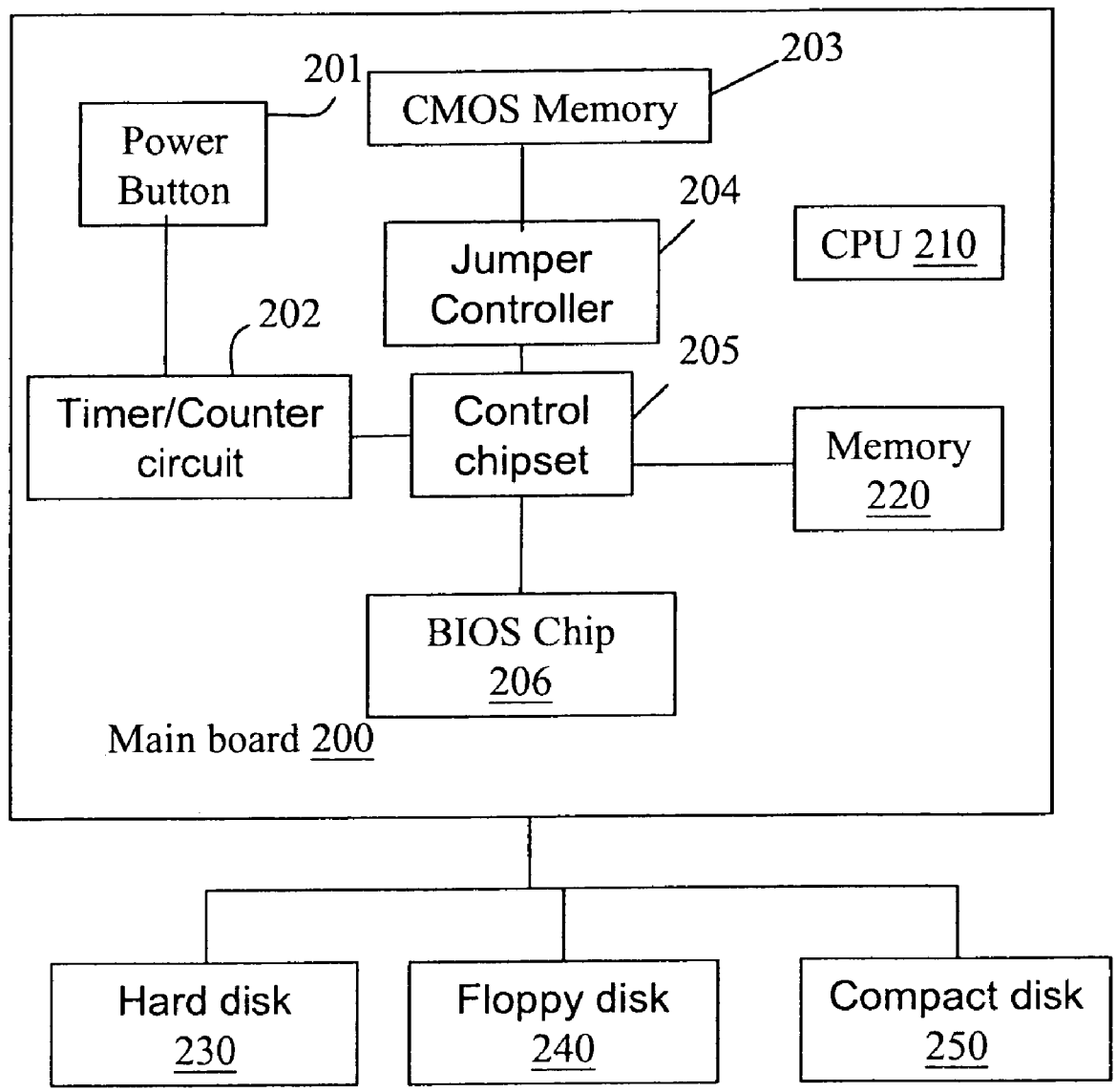
FIG. 2 is a schematic view of a system for implementation the restoring method with a single button in accordance with an embodiment of the present invention.

Turning now to FIG. 2, FIG. 2 illustrates a system in accordance with the preferred embodiment. In the embodiment, the system specialized for the method comprises the host computer including a motherboard 200, a CPU 210, a memory 220, a hard disk 230, a floppy disk 240, and a compact disk 250. The motherboard 200 is embedded with a timer/counter circuit 202, a CMOS memory 203, a jumper controller 204, a control chipset 205, and a BIOS chipset 206. The BIOS program is stored in the BIOS chipset 206. When the power button is pressed, the BIOS chipset 206 retrieves the BIOS program and loads the BIOS program in the memory 220 to run the boot-up configuration process. The computer manufacturer predefines the relation between the "press" modes of the power button 201 and the restoring items in the control chipset 205 before the main board is manufactured. In addition, the processes for restoring system configuration in accordance with the restoring items, especially the processes for restoring the BIOS configuration, are recorded.

The press modes are the combinations of times and durations of pressing power button. For example, pressing the power button 201 for several seconds and subsequently pressing three times is one of the press modes. The computer system can detect the times and durations of pressing the power button via a timer/counter circuit 202, and can further determine the press mode. The timer/counter circuit 202 is composed of an oscillator embedded in the motherboard and a simple operation chipset. The timer/counter circuit 202 is coupled to the power button 201 with one port, and coupled to the control chip 205 with another port. By adding up the times and the durations of the circuit conduction caused by pressing the power button, the computer system gets the results of pressing times and intervals of the power button 201. The press mode detected is then transferred to the control chip 205.

The following descriptions describe a preferred embodiment of the press mode, the restoring item, and the process of restoring system configuration corresponding to the press mode.

When the power button 201 is pressed for 3 seconds, and then is pressed once, the clearing process of the information stored in the CMOS memory is executed. The process for clearing the information stored in the CMOS memory comprises: transmitting signals of clearing information to the jumper controller 204 via the control chipset 205; transmitting the control voltage via the jumper controller 204 to disconnect the information storing pin of CMOS memory; and enabling the information erasing pin to clear the BIOS setting of the relevant system configuration stored in the CMOS memory.

When the power button 201 is pressed for 3 seconds, and then is pressed twice, the restoring process of original system configuration setting is executed. The process of restoring original system configuration setting comprises: retrieving original BIOS parameters (BIOS configuration) from the storage location, such as the storage space in the BIOS chipset 206, the memory 220, the hard disk 230, the floppy disk 240, and the compact disk 250, etc.; replacing the current BIOS with the original one after the original BIOS parameters are retrieved; and rebooting the computer to complete the restoring system configuration setting.

When the power button 201 is pressed for 3 seconds, and then is pressed three times, the rewriting process of BIOS program is executed. The process of rewriting the BIOS program comprises: retrieving the original BIOS program from the above-mentioned storage location; replacing the current BIOS program with the original one (i.e., the original BIOS program is written in the current storing space); and rebooting the computer again. After the rewriting steps are executed, the current BIOS program is replaced by the original BIOS program. With regard to the motherboard supporting dual-BIOS, the computer usually has two BIOS programs. When the available BIOS is corrupted, the original BIOS is written to replace the present BIOS. However, if the motherboard does not support dual-BIOS, when booting up the computer for the first time, the BIOS program is backed up at the above-mentioned storage location to save the original BIOS program.

When the computer cannot be booted normally, the user can press the power button 201 for 3 seconds, and then press once to restore original system configuration setting. Similarly, the user can press the power button 201 for 3 seconds, and then press three times to rewrite the BIOS program. If the press mode detected is not the predetermined mode, i.e., the computer system cannot check the restoring item represented by the press mode, the normal boot sequence is performed. The process of clearing the information stored in the CMOS memory must be executed in the circumstance when the computer is powered off. However, the process of restoring original system configuration setting and the process of rewriting the BIOS program can be executed in the circumstance when the computer is powered on.

Figure 3:
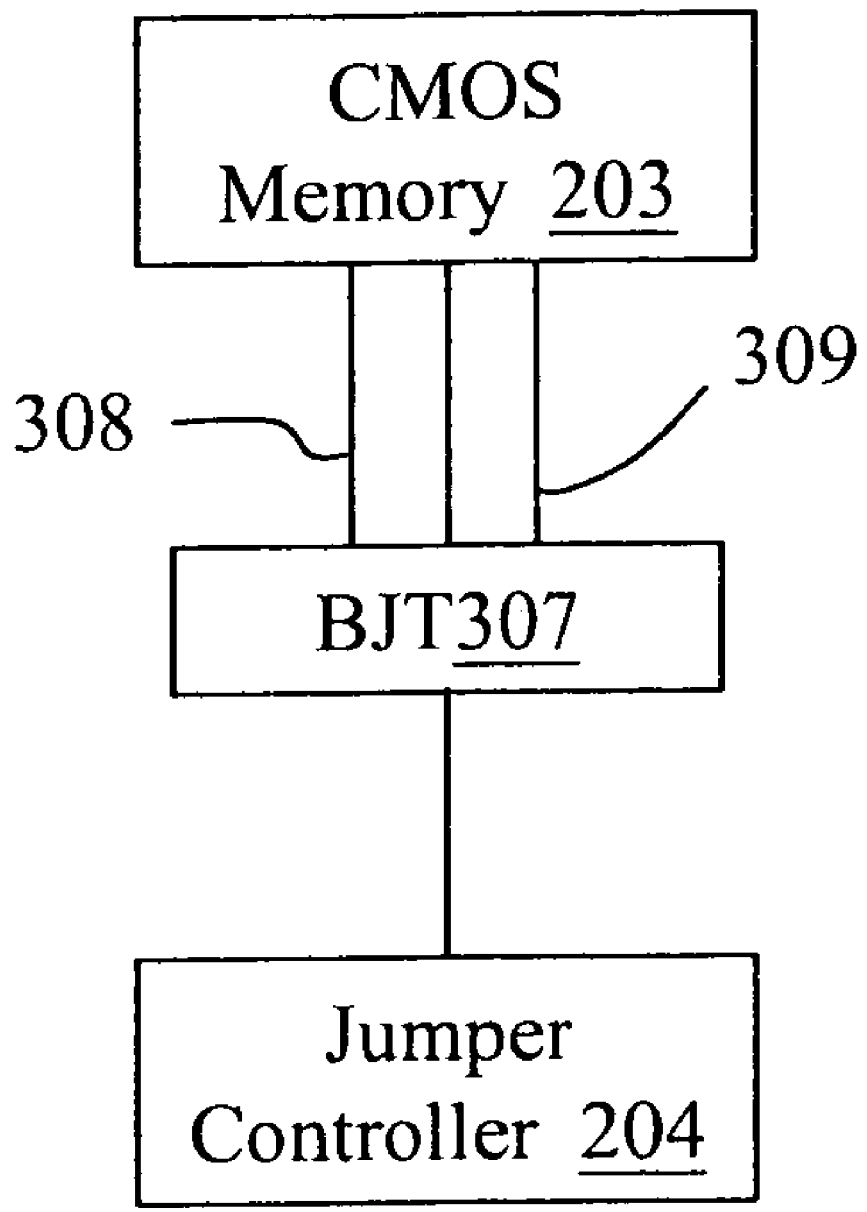
FIG. 3 is a schematic view of a CMOS memory connected to jumper controller in accordance with an embodiment of the present invention.

The BIOS configuration setting stored in the CMOS memory is cleared by enabling the information erasing pin of the CMOS memory. Referring to FIG. 3, FIG. 3 shows a block diagram of the jumper controller connected to the CMOS memory. In one preferred embodiment, a BJT 307 is connected to the information storing pin 308 and the information erasing pin 309 of the CMOS memory 203. When the computer is powered on, the jumper controller 204 transfers forward bias to conduct the information storing pin 308. At the same time, the information erasing pin 309 is connected physically to the jumper controller but not conducted electrically. When the jumper controller transfer reverse bias, the information storing pin 308 is equal to an open circuit, but the information erasing pin 309 is enabled to be conducted electrically. After the information erasing pin 309 is enabled, the BIOS configuration setting stored in the CMOS memory 203 is cleared instantly. In one preferred embodiment, the BJT

307 transfers forward/reverse bias to enable the information erasing pin 309. In this way, the information stored in the CMOS memory is released without opening the computer case. The foregoing embodiment is intended to be illustrative and not limiting. Alternatively, other components can be used to control voltage to enable the information erasing pin 309 such that the information stored in the CMOS memory can be cleared.

As described above, the advantages of the method for automatically updating/recovering the BIOS program based on a plurality of press modes are as follows:

1. Without performing complicated steps, the BIOS configuration or the BIOS program can be updated just by pressing one button; and 2. Without opening the computer case, the BIOS program can be updated and/or the system configuration information stored in the CMOS memory can be cleared.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatically restoring a system configuration with a single key, wherein the method is used to set/recover system configuration parameters in order to ensure a normal boot-up sequence, wherein the method comprises:
   detecting a mode of press modes of a power button;
   determining one of restoring items according to the mode;
   restoring the system configuration corresponding to the one of the restoring items; and
   performing a normal boot process,
   wherein the restoring items comprise commands of clearing information stored in a CMOS memory, restoring original system configuration setting, and rewriting a BIOS program, and each one of the press modes corresponds to a different one of the restoring items,
   wherein
   when the power button is pressed twice for two different durations, the step of clearing information stored in the CMOS memory is executed;
   when the power button is pressed for a first duration and sequentially pressed twice for a second duration equally, the step of restoring the original system configuration setting is executed; and
   when the power button is pressed for the first duration and sequentially pressed three times for the second duration equally, the step of rewriting the BIOS program is executed.

2. The method of claim 1, wherein the mode is based on a combination of pressing times and pressing durations of the power button, and/or intervals between two immediately adjacent presses.

3. The method of claim 2, wherein the pressing times and the pressing durations are detected by a timer/counter circuit.

4. The method of claim 1, wherein the command of clearing information stored in the CMOS memory further comprises commands of:
   transferring signals of clearing information to a jumper controller via a control chipset; and
   transferring a control voltage via the jumper controller to disconnect an information storing pin of the CMOS memory and to enable an information erasing pin of the CMOS memory.

5. The method of claim 1, wherein the step of restoring the original system configuration setting further comprises:
   retrieving the original system configuration from a storage location;
   replacing a current system configuration with the original system configuration; and
   rebooting a computer.

6. The method of claim 1, wherein the step of rewriting the BIOS program further comprises:
   retrieving the original BIOS program from a storage location;
   replacing a current BIOS program with the original BIOS program; and
   rebooting a computer.

7. The method of claim 1, further comprising:
   when failing to distinguish the one of the restoring items corresponding to the mode, running the normal boot sequence.

* * * * *